United States Patent Office 3,143,525
Patented Aug. 4, 1964

3,143,525
PREPARATION OF POLYCARBONATES BY
SUSPENSION POLYMERIZATION
John B. Ott, Northampton, Mass., assignor to Monsanto
Company, a corporation of Delaware
No Drawing. Filed Feb. 27, 1959, Ser. No. 795,892
6 Claims. (Cl. 260—47)

This invention relates to the preparation of polycarbonate resins. More particularly, it relates to a process for preparing high molecular weight polycarbonate resins in particular form.

Polycarbonate resins have been prepared by co-reacting phosgene and bisphenol compounds in an aqueous alkaline reaction media in the presence of an inert, water-immiscible, organic solvent for the resinous condensate formed. Low molecular weight polycarbonate resins are readily obtained in this way, but continued condensation to form high molecular weight polymers results in a progressive increase in the solution viscosity of the organic phase with an apparent cross-emulsification of the aqueous alkaline phase. As a result, high molecular weight polycarbonate resins are obtained only as extremely viscous to dough-like masses, containing, in addition to the organic solvent, occluded salts and alkali. Purification of the resin requires extensive mechanical working and washing with large volumes of water. Even then, the recovered polycarbonate resin remains contaminated with excessive quantities of chloride salts, imposing severe restrictions on its utility.

It is an object of this invention to provide high molecular weight polycarbonate resins which are relatively free of salt contamination.

Another object is the provision of a novel process for preparing polycarbonate resins from phosgene and a bis(hydroxyaryl) compound wherein a relatively salt-free polymeric product may be readily and inexpensively recovered.

These and other objects are obtained by co-reacting phosgene and a bisphenol compound in an aqueous reaction media in the presence of critical proportions of an inert organic solvent, an acid acceptor and a suspending agent as hereinafter set forth.

The following examples are presented in illustration of this invention and are not intended as limitations thereon. Where parts are mentioned they are parts by weight.

*Example I*

A stirred reactor is purged with nitrogen and then charged with 175 parts of a 10% by weight aqueous sodium hydroxide solution, 25 parts of 2,2-bis(4-hydroxyphenyl)propane and 0.01 part of sodium thiosulfate. Maintaining a reaction temperature of about 20° C., a solution of 15 parts of phosgene dissolved in 25 parts of dichloromethane is then charged to the reactor at a rate of about 1 ml. per minute, amid vigorous agitation to assure intimate contact between the aqueous and organic phases. After all of the phosgene solution has been added, 25 parts of a 1% by weight aqueous solution of the sodium salt of a copolymer comprising about 4.5 mol percent of 2-ethylhexyl methacrylate and 95.5 mol percent of acrylic acid and having a weight average molecular weight of about 100,000 are charged. Agitation is continued, maintaining the reactor contents at about 20° C. for an additional 10 minutes, after which 4 ml. of a 10% aqueous solution of tetra ethyl ammonium hydroxide are charged to the reaction mixture. The reaction temperature is increased to about 25° C. and is maintained thereat, with agitation, for an additional 150 minutes. The reaction is terminated by allowing the reaction mixture to settle into two gross phases. Solids are recovered by filtration and washed, successively, with four 1 liter portions of water, 250 ml. of 0.1 normal sulfuric acid and finally with four more 1 liter portions of water. The solids obtained are a solid solution of polycarbonate resin in dichloromethane and take the form of white opaque particles having an average size of about 2 mm. in diameter. The dichloromethane is removed by drying the particles in a hot air oven at about 100° C. for about 4 hours. Twenty-five parts of polycarbonate particles having a weight average molecular weight of about 100,000 and melting at about 240° C., leaving substantially no solid residue, are obtained. Analysis for chloride ion shows the resin to contain about 0.1% chloride by weight.

*Example II*

A stirred reactor is purged with nitrogen and then charged with 350 parts of a 10% by weight aqueous sodium hydroxide solution, 45 parts of 2,2-bis(4-hydroxyphenyl)propane, 50 parts of dichloromethane and 0.01 part of sodium thiosulfate. Maintaining a reaction temperature of about 25° C., a solution of 30 parts of phosgene dissolved in 50 parts of dichloromethane is then charged to the reactor at a rate of about 1 ml. per minute, amid vigorous agitation to assure intimate contact between the aqueous and organic phases. After 15 ml. of the phosgene solution have been added, 20 parts of a 1% by weight aqueous solution of the sodium salt of a copolymer comprising about 3 mol percent of dodecyl acrylate and 97 mol percent of acrylic acid and having a weight average molecular weight of about 100,000 are charged. Agitation is continued, maintaining the reactor contents at about 25° C. throughout the addition of the remaining phosgene solution and for about 60 minutes thereafter. Three ml. of a 25% aqueous solution of stearyl dimethyl benzyl ammonium chlorides are then charged and the reaction is continued for a further 60 minutes. The reaction is terminated by ceasing agitation and allowing the reaction mixture to separate into two gross phases. Solids are recovered by filtration and washed, successively, with four 1 liter portions of water, 50 ml. of a 2% by weight aqueous sodium hydroxide solution and finally with four more 1 liter portions of water. The solids obtained are a solid solution of polycarbonate resin in dichloromethane and take the form of white opaque particles having an average size of about 1.5 mm. in diameter. The dichloromethane is removed by drying the particles in a hot air oven at about 90° C. for about 16 hours. Thirty-four parts of polycarbonate particles having a weight average molecular weight of about 30,000 and melting at about 240° C., leaving substantially no solid residue, are obtained. Analysis for chloride ion shows the resin to contain about 0.05% chloride by weight.

*Example III*

A stirred reactor is purged with nitrogen and then charged with 340 parts of a 10% by weight aqueous pyridine solution, 25 parts of 2,2-bis(2-ethyl-4-hydroxyphenyl)pentane, 15 parts of benzene and 0.01 part of sodium thiosulfate. Maintaining a reaction temperature of about 20° C., a solution of 15 parts of phosgene dissolved in 30 parts of benzene is then charged to the reactor at a rate of about 1 ml. per minute, amid vigorous agitation to assure intimate contact between the aqueous and organic phases. After all of the phosgene solution has been added, 10 parts of an aqueous slurry containing 0.3 part of calcium phosphate having an average particle size of about 0.1 micron are added. Agitation is continued, maintaining the reactor contents at about 20° C. for an additional 20 minutes at which point 10 ml. of a 10% aqueous solution of N-n-decyl pyridinium hydroxide are charged to the reaction mixture. The reaction temperature is increased to 40° C. and is maintained thereat for an additional 100 minutes. The reaction is terminated by allowing the reaction mixture to settle into two gross phases. Solids are recovered by filtration and washed, successively, with three 1 liter portions of water, 25 ml. of 0.1 normal hydrochloric acid and finally with three more 1 liter portions of water. The solids obtained are a solid solution of polycarbonate resin in benzene and take the form of white opaque particles having an average size of about 2 mm. in diameter. The benzene is removed by steam distillation, drying the particles afterwards in a hot air oven at 120° C. for about 3 hours. Twenty parts of polycarbonate particles having a weight average molecular weight of about 50,000 and melting at about 240° C., leaving substantially no solid residue, are obtained. Analysis for chloride ion shows the resin to contain about 0.1% chloride by weight.

The following examples are presented for comparison. They show, respectively, the products obtained in the absence of suspending agent and those obtained using a non-beneficial suspending agent.

*Example IV*

A stirred reactor is purged with nitrogen and then charged with 350 parts of a 10% by weight aqueous sodium hydroxide solution, 45 parts of 2,2-bis(2-ethyl-4-hydroxyphenyl)propane, 50 parts of dichloromethane and 0.01 part of sodium thiosulfate. Maintaining a reaction temperature of about 25° C., a solution of 30 parts of phosgene dissolved in 50 parts of dichloromethane is then charged to the reactor at a rate of about 1 ml. per minute, amid vigorous agitation to assure intimate contact between the aqueous and organic phases. After all of the phosgene solution has been charged, the reaction is continued at about 25° C. for an additional 60 minutes, at which point 2 ml. of a 25% aqueous solution of stearyl dimethyl benzyl ammonium chloride are charged and the reaction is continued for an additional 60 minutes. The reaction is terminated by ceasing agitation and the reaction mixture immediately flocculates to a gross suspension which rapidly settles into a two-phase system. After decanting the aqueous phase, the viscous white organic phase is washed with six successive 1 liter portions of water, stirring vigorously each time. The organic phase continues to increase in viscosity with repeated stirring and washing until it breaks up into a slurry of large crumb-like particles. These particles are washed with 50 ml. of a 2% by weight aqueous sodium hydroxide solution and finally are again washed with six 1 liter portions of water. The crumb-like particles are essentially a solid solution of polycarbonate resin in dichloromethane containing a small proportion of occluded aqueous phase. The water and dichloromethane are removed by drying the crumbs in a hot air oven at 90° C. for about 16 hours. Forty parts of polycarbonate resin having a weight average molecular weight of about 30,000 are obtained. The resin melts at about 240° C. leaving a small amount of solid residue. Analysis for chloride ion shows the resin to contain about 2.0% chloride by weight.

*Example V*

A stirred reactor is purged with nitrogen and then charged with 350 parts of a 10% by weight aqueous sodium hydroxide solution, 45 parts of 2,2-bis(4-hydroxyphenyl)propane, 30 parts of dichloromethane, 0.3 part of a polyvinyl methyl ether having a weight average molecular weight of about 50,000 and 0.01 part of sodium thiosulfate. Maintaining a reaction temperature of about 20° C., a solution of 30 parts of phosgene dissolved in 70 parts of dichloromethane is then charged to the reactor at a rate of about 1¼ ml. per minute, amid vigorous agitation to assure intimate contact between the aqueous and organic phases. After all of the phosgene solution has been charged, 2 ml. of a 25% aqueous solution of stearyl dimethyl benzyl ammonium chloride are added and the reaction is continued at about 25° C. for an additional 100 minutes during which time the reaction mixture coagulates into a lumpy dough-like mass. The lumpy mass is placed in a kneader and washed, successively, with six 1 liter portions of water, 50 ml. of 0.1 normal hydrochloric acid and finally with four more 1 liter portions of water. The dough-like mass consists essentially of a soft solid solution of polycarbonate resin in dichloromethane and contains a small proportion of occluded aqueous phase. The water and dichloromethane are removed by drying the mass in a hot air oven at 90° C. for about 10 hours. Thirty-nine parts of a purple polycarbonate resin having a weight average molecular weight of about 40,000 are obtained. The resin melts at about 240° C. leaving a small amount of solid residue. Analysis for chloride ion shows the resin to contain about 2.3% chloride by weight.

In place of the bis(hydroxyaryl) compounds employed in the examples may be substituted other homologues thereof of the classes represented by the following general formulae:

(a)   HO—A—A—OH
(b)   HO—A—O—A—OH
(c)   HO—A—SO₂—A—OH
(d)   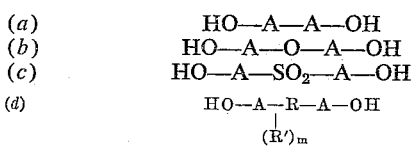

In the above formulae, A represents an aromatic radical and the R′ groups may be, independently, either hydrogen or monovalent hydrocarbon radicals containing from 1–6 carbon atoms or various combinations thereof. R may be an alkylene or alkylidene radical containing from 1–6 carbon atoms and $m$ is a whole number equal to twice the number of carbon atoms contained in R. Among the aromatic radicals which A represents are included, for example, the aromatic hydrocarbon residues based on benzene, biphenyl, naphthalene, anthracene, etc. and the halo, nitro, alkyl, aryl and alkoxy substituted derivatives thereof. Examples of monovalent hydrocarbon radicals represented by R′ include methyl, ethyl, propyl, isopropyl, butyl, hexyl, cyclohexyl, phenyl, etc. radicals. Examples of R include methylene, ethylene, ethylidene, propylene, propylidene, isopropylidene, butylene, butylidene, isobutylidene, amylene, isoamylene, amylidene, isoamylidene, hexylene, etc. radicals.

The positions of the hydroxyl groups on the aromatic radical may be varied in the ortho-, meta- or para-positions, and the halo, nitro, alkyl and alkoxy substituents thereof may be positioned on the nucleous in a vicinal, asymmetrical or symmetrical relationship.

Therefore, examples of bis(hydroxyaryl) compounds suitable for use in the process of this invention include bis(4-hydroxyphenyl), 2,4′-dihydroxydiphenyl, 2,4′-dihydroxydiphenyl methane, bis(2-hydroxyphenyl)methane, bis(4 - hydroxyphenyl)-methane, bis(4-hydroxy-5-nitrophenyl)methane, bis(4-hydroxy-2,6-dimethyl-3-methoxyphenyl)methane, 1,1-bis(4-hydroxyphenyl)ethane, 1,2-bis (4 - hydroxyphenyl)ethane, 1,1,-bis(4-hydroxy-2-chlorophenyl)ethane, 1,1 - bis(2,5-dimethyl-4-hydroxyphenyl) ethane, 1,3-bis(3-methyl-4-hydroxyphenyl)propane, 2,2-bis(3 - phenyl-4-hydroxyphenyl)-propane, 2,2-bis(3-isopropyl-4-hydroxyphenyl)propane, 2,2-bis(4-hydroxynaphthyl)propane, 2,2-bis(4-hydroxyanthracyl)butane, 1,4-bis (2-hydroxyphenyl)butane, 2,2-bis(2-ethyl-4-hydroxypenyl)pentane, 2,4-bis(4-hydroxyphenyl)heptane, bis(4-hydroxyphenyl)phenyl methane, bis(3-nitro-4-hydroxyphenyl)cyclohexyl methane, 1,2-bis(4-hydroxyphenyl)-1,2-bis (phenyl)ethane, 2,2-bis(2-hydroxyphenyl)-1,3-bis(methyl)propane, etc. Mixtures of such bis(hydroxyaryl) compounds may also be employed to produce polycarbonate resins containing a plurality of bis(hydroxyaryl) moieties.

The suspending agents employed in the processes of this invention may be either relatively water-insoluble inorganic compounds or water- or alkali-soluble organic polymers, as hereinafter set forth. The inorganic suspending agents employed are non-amphoteric materials having a solubility in water of less than 0.01 part per 100 parts of water on a weight basis. They must be preferentially wet by the aqueous phase rather than by the organic solvent. Examples of inorganic compounds satisfying these requirements include clays such as kaolin, montmorillonite, etc., calcium phosphate, calcium oxalate, cadmium oxalate, barium sulphate, barium sulfite, strontium sulfite, barium carbonate, calcium carbonate, calcium fluoride, magnesium fluoride, magnesium hydroxide, cadmium hydroxide, beryllium oxide, etc. Such inorganic suspending agents should have an average particle size of less than about 10 microns. More preferably, the average particle size thereof should be less than 2 microns to provide maximum surface area per unit weight.

Water or alkali-soluble organic polymers of the classes outlined below and having a weight average molecular weight of at least 10,000 may also be used as suspending agents. The organic polymers employed are (1) polymers of acrylic or methacrylic acids and copolymers thereof with up to 40% by weight of a vinylidene monomer copolymerizable therewith, such as e.g., acrylate or methacrylate esters, maleic acid or anhydride, maleimide, vinyl aromatic monomers such as styrene, alpha-methyl styrene and the alkyl substituted derivatives thereof, etc., olefins such as ethylene, isopropylene, isobutylene, etc.; (2) polymers containing tertiary amino groups such as, e.g. polyvinyl pyridine and the nuclear substituted 1-3 carbon atom alkyl derivatives thereof, N,N-dialkyl-beta-amino ethyl esters of acrylic or methacrylic acids wherein the alkyl groups contain from 1-20 carbon atoms and the higher homologues thereof, etc.; (3) polymers containing quaternary ammonium groups such as, e.g., the reaction products of the aforementioned polymers containing tertiary amino groups and a primary or secondary alkyl halide containing from 1-20 carbon atoms, etc. and copolymers of such with up to 40% by weight of a vinylidene monomer copolymerizable therewith such as, e.g., acrylate or methacrylate esters, maleic acid or anhydride, maleimide, vinyl aromatic monomers such as styrene, alpha-methyl styrene and the alkyl substituted derivatives thereof, etc., olefins such as ethylene, isopropylene, isobutylene, etc.; and (4) polyethylene oxides corresponding to the general formula

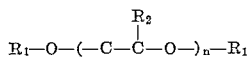

wherein $R_1$ is an alkyl group containing from 1-20 carbon atoms, $R_2$ is either hydrogen or a methyl group, or mixtures thereof, and $n$ is an integer of such magnitude as to provide a weight average molecular weight of at least 10,000.

Examples of suitable organic polymers include, therefore, polyacrylic acid, polymethacrylic acid, methylmethacrylate-acrylic acid copolymers, ethyl acrylate-methacrylic acid copolymers, dodecyl acrylate-acrylic acid copolymers, ethylhexyl acrylate-acrylic acid copolymers, maleic acid-acrylic acid copolymers, styrene-methacrylic acid copolymers, alphamethyl styrene-acrylic acid copolymers, para-ethyl styrene-acrylic acid copolymers, ethylene-methacrylic acid copolymers, isobutylene-acrylic acid copolymers, polyvinyl pyridine, poly 2-vinyl-6-propyl pyridine, poly N,N-dimethyl-beta-amino ethyl ester of methacrylic acid, poly N,N-methyl, stearyl-beta-amino ethyl ester of acrylic acid, poly N,N-dibutyl-beta-amino butyl ester of acrylic acid, poly 4-vinyl-N-butyl pyridinium hydrobromide, poly 4-vinyl-N-acetyl pyridinium hydrochloride, copolymers of styrene and 4-vinyl-N-butyl pyridinium hydrobromide, dibutyl ethers of polyethylene oxides, diethyl ethers of polyisopropylene oxides, distearyl ethers of polyethylene oxides, etc. If desired, mixtures of such organic polymers may be employed.

In the process of this invention, a suitable reaction vessel equipped with means for agitating the reaction mixture and for regulating the temperature thereof is charged with water and an acid acceptor. The desired bis(hydroxyaryl) compound is charged and subsequently reacted with at least an equimolar proportion of phosgene. Preferably, a 10-20% molar excess of phosgene is employed, the phosgene being charged slowly to maximize control of the reaction. Reaction temperatures ranging from the freezing point of the reaction system or any portion thereof to about 40° C. are employed. In practice, temperatures of from about 10-40° C. are preferred. The reaction is effected in the presence of a water-immiscible organic solvent which satisfies the dual requirements of being inert to reaction with phosgene and a solvent for the polycarbonate resin produced. A suspending agent of the class hereinbefore set forth is charged to the reaction vessel at any stage of the reaction before the organic phase becomes too viscous to form discrete beads in aqueous suspension. The presence of oxygen or other oxidizing agent in the reaction system precludes the obtainment of satisfactory polycarbonate resins. Therefore, the reaction system should be carefully purged of air with an inert gas such as nitrogen, etc. The optional addition of a water-soluble reducing agent, e.g., sodium thiosulfate, etc., to the reaction system provides additional insurance against oxidation. Such reducing agent, if employed, should be inert to reaction with the phosgene. Condensation to form low molecular weight polycarbonates occurs substantially spontaneously. However, the formation of high molecular weight polymers requires the presence of a catalyst. Quaternary ammonium bases or salts thereof containing from 6-14 carbon atoms are employed in such function and may be added at any stage in the reaction, allowing, of course, sufficient time for polymer growth before terminating the reaction. Catalyst concentrations of from 0.001-2% by weight based upon the polycarbonate resin formed are effective. However, concentrations of from 0.1-1% give high molecular weights within reasonable reaction times. Examples of suitable catalysts include stearyl dimethyl benzyl ammonium hydroxide, tetra ethyl ammonium hydroxide, N-n-decyl pyridinium hydroxide, etc. and their salts.

From 0.3-10 parts by weight of organic solvent are employed per part by weight of polycarbonate product obtained. However, it has been found that an optimum solution viscosity, from the standpoint of attaining high molecular weights plus good bead formation, within the organic phase is obtained using from about 1-3 parts by weight of organic solvent per part by weight of polycarbonate resin. In various embodiments, the organic solvent may be charged to the reaction vessel at the same time as the phosgene, preferably as a solution of phosgene dissolved in the organic solvent, or it may be charged, in whole or in part, prior to the addition of the phosgene. The organic solvent employed should be either immiscible with or have only slight solubility in water and should be inert to the reactants under the reaction conditions employed. Those solvents boiling at less than about 150° C. are especially preferred. Examples of suitable organic solvents include haloalkanes such as dichloromethane, 1,1-dichloropropane, 3,4-dichloro-2-methyl-butane, 1,1,1-trichloroethane, 1,2,3-trichloropropane, etc.; benzene and the alkyl substituted derivatives thereof such as toluene, xylene, etc.; dialkyl ethers such as diethyl ether, dipropyl ether, ethylhexyl ether, etc.

A volume of water equal to from 0.5-10 times the volume of organic solvent employed is used to form the aqueous phase of the reaction mixture. However, superior dispersions are obtained using a volume of water equal to from 0.7-1.5 times the volume of the organic solvent. A water-soluble acid acceptor is dissolved in the aqueous phase for the purpose of combining with the hydrogen and chlorine liberated by the reactants during the course of the condensation. The quantity of acid acceptor employed should be at least stoichiometrically equivalent to the quantity of phosgene employed, i.e., at least 2 mols of acid acceptor should be present per mol of phosgene charged. Suitable acid acceptors include, for example, alkali metal hydroxides such as sodium hydroxide, potassium hydroxide, etc.; water-soluble carbonates such as sodium carbonate, potassium carbonate, ammonium carbonate, etc.; pyridine, etc.

The suspending agent is employed in concentrations of from 0.01–5% by weight based upon the total weight of the dispersed organic phase, i.e., both organic solvent and polycarbonate resin. However, in a preferred embodiment, from 0.1–1.5% by weight of suspending agent is employed to provide superior dispersions. In various embodiments, the suspending agent may be charged at any stage of the process before the organic phase becomes too viscous to form small particles, i.e., about 500 poise. Therefore, the suspending agent may be charged either prior to or during the addition of the phosgene. However, it is preferred to charge the suspending agent at a stage after the phosgene has been charged but before the viscosity of the organic phase attains the aforesaid limits.

The reaction is readily terminated by merely ceasing to agitate the reaction mixture, allowing the aqueous phase to separate from the organic phase. A major advantage of this suspension process lies in the ready separation of the two phases with little or none of the aqueous phase remaining occluded within the organic phase. Since the major portion of the contaminants present, e.g., salts, acid acceptor, catalyst, etc. are water-soluble, they are largely removed as part of the aqueous phase by conventional methods such as filtration, decantation, etc. The beaded organic phase is leached with water to remove any remaining contaminants. If desired, the beads may be leached with dilute sodium hydroxide to remove any carboxylic acid which may have been formed during the reaction. A subsequent washing with, e.g., dilute hydrochloric acid or sulfuric acid, followed by a wash with water will remove all traces of sodium hydroxide.

The product obtained is a solid, or pasty, solution of polycarbonate resin in the organic solvent. By the agency of the suspension process the product takes the form of extremely small discrete particles having solid to tacky surfaces. The organic solvent contained therein may be removed by conventional techniques such as steam distillation or evaporation in a hot air oven at a temperature below the softening point of the polycarbonate resin. It has been found that polycarbonate resins containing less than 0.5% chloride by weight are readily obtainable by the process of this invention. In fact, electrical grade polycarbonate resins, containing less than about 0.05% chloride by weight, may be prepared according to the process of this invention.

The polycarbonate resins produced according to the process of this invention find many applications. They may be solvent cast or extruded to form films and sheets for, e.g., packaging, photographic, etc. purposes. They may be wet or dry spun, or melt extruded to form filaments for, e.g., textile applications. Those resins having less than about 0.05% chloride content may be employed in electrical applications.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing polycarbonate resins by suspension polymerization which comprises reacting a bis(hydroxyaryl) compound with at least an equimolar proportion of phosgene at a temperature of from above the freezing point of the reaction mixture to 40° C. in a substantially oxygen-free aqueous reaction system in the presence of (a) from 30–1000% by weight, based upon the total weight of reactants, of an inert water-immiscible organic solvent for the polycarbonate resin formed, (b) at least 2 mols of a water-soluble acid acceptor per mol of phosgene employed, (c) from 0.001–2% by weight, based upon the total weight of reactants, of a quaternary ammonium salt containing from 6–14 carbon atoms and (d) from 0.01–5% by weight, based upon the total weight of reactants plus organic solvent, of a suspending agent; the volume of water employed in the aqueous phase being equal to from 0.5–10 times the volume of the organic solvent employed; said bis(hydroxyaryl) compound corresponding to a formula selected from the group consisting of:

(a) HO—A—A—OH
(b) HO—A—O—A—OH
(c) HO—A—SO$_2$—A—OH
(d) HO—A—R—A—OH
        |
     (R')$_m$ wherein A represents an aromatic radical, R' represents radicals independently selected from the class consisting of hydrogen and monovalent hydrocarbon radicals containing from 1–6 carbon atoms, R represents a radical selected from the class consisting of alkylene and alkylidene radicals containing from 1–6 carbon atoms and $m$ is a whole number equal to twice the number of carbon atoms contained in R; said suspending agent being selected from the classes consisting of (1) non-amorphoteric inorganic compounds having a solubility in water of less than 0.01 part per 100 parts of water on a weight basis and preferentially wet by the aqueous phase, said inorganic compound having an average mean particle size of less than 10 microns and (2) soluble organic polymers having a weight average molecular weight of at least 10,000 selected from the group consisting of (a) homopolymers of acrylic and methacrylic acids and copolymers thereof with vinylidene monomers copolymerizable therewith, (b) homopolymers containing tertiary amino groups, (c) homopolymers containing quaternary ammonium groups and copolymers thereof with vinylidene monomers copolymerizable therewith and (d) dialkyl ethers of polyethylene oxides corresponding to the general formula:

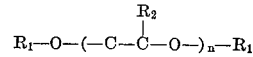

wherein $R_1$ is an alkyl radical containing from 1–20 carbon atoms, $R_2$ is a radical selected from the group consisting of hydrogen and methyl radicals and mixtures thereof and $n$ is an integer of sufficient magnitude to provide a total weight average molecular weight of at least 10,000.

2. A suspension polymerization process as in claim 1 wherein the bis(hydroxyaryl) compound is 2,2-bis(4-hydroxyphenyl)propane.

3. A polycarbonate resin as produced by the process of claim 1 and containing less than 0.1% of residual chlorine by weight.

4. A process for preparing polycarbonate resins by suspension polymerization which comprises reacting a bis(hydroxyaryl) compound with at least an equimolar proportion of phosgene at a temperature of from 10–40° C. in a substantially oxygen-free aqueous reaction system in the presence of (a) from 100–300% by weight, based upon total weight of reactants, of an inert water-immiscible organic solvent for the polycarbonate resin formed, (b) at least 2 mols of a water-soluble acid acceptor per mol of phosgene employed, (c) from 0.1–1% by weight, based upon the total weight of reactants, of a quaternary ammonium salt containing from 6–14 carbon atoms and (d) from 0.1–1.5% by weight, based upon the total weight of reactants plus organic solvent, of a suspending agent, the volume of water employed in the aqueous phase being equal to from 0.7–1.5 times the volume of the organic solvent employed; said bis(hydroxyaryl) compound corresponding to a formula selected from the group consisting of:

(a) HO—A—A—OH
(b) HO—A—O—A—OH
(c) HO—A—SO$_2$—A—OH
(d) HO—A—R—A—OH
        |
     (R')$_m$ wherein A represents an aromatic radical, R' represents radicals independently selected from the class consisting of hydrogen and monovalent hydrocarbon radicals containing from 1-6 carbon atoms, R represents a radical selected from the class consisting of alkylene and alkylidene radicals containing from 1-6 carbon atoms and $m$ is a whole number equal to twice the number of carbon atoms contained in R; said suspending agent being selected from the classes consisting of (1) non-amphoteric inorganic compounds having a solubility in water of less than 0.01 part per 100 parts of water on a weight basis and preferentially wet by the aqueous phase, said inorganic compound having an average mean particle size of less than 2 microns and (2) soluble organic polymers having a weight average molecular weight of at least 10,000 selected from the group consisting of (a) homopolymers of acrylic and methacrylic acids and copolymers thereof with vinylidene monomers copolymerizable therewith, (b) homopolymers containing tertiary amino groups, (c) homopolymers containing quaternary ammonium groups and copolymers thereof with vinylidene monomers copolymerizable therewith and (d) dialkyl ethers of polyethylene oxides corresponding to the general formula:

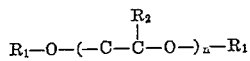

wherein $R_1$ is an alkyl radical containing from 1-20 carbon atoms, $R_2$ is a radical selected from the group consisting of hydrogen and methyl radicals and mixtures thereof and $n$ is an integer of sufficient magnitude to provide a total weight average molecular weight of at least 10,000.

5. A suspension polymerization process as in claim 4 wherein the bis(hydroxyaryl) compound is 2,2-bis(4-hydroxyphenyl)propane.

6. A polycarbonate resin as produced by the process of claim 4 and containing less than 0.1% of residual chlorine by weight.

References Cited in the file of this patent

UNITED STATES PATENTS

| | | |
|---|---|---|
| 2,789,965 | Reynolds et al. | Apr. 23, 1957 |
| 2,816,879 | Wittbecker | Dec. 17, 1957 |
| 2,997,459 | Schnell et al. | Aug. 22, 1961 |

OTHER REFERENCES

Schildknecht: "Polymer Processes," volume 10, 1956, pages 78-81.

Schnell: "Angewandte Chemie," 68, No. 20, Oct. 21, 1956, pages 633-640.